(12) United States Patent
Fukano et al.

(10) Patent No.: US 8,913,267 B2
(45) Date of Patent: Dec. 16, 2014

(54) PRINTING SYSTEM AND PROGRAM

(75) Inventors: Nobuya Fukano, Tokyo (JP); Yoshihiro Yano, Tokyo (JP); Takayuki Chikada, Tokyo (JP)

(73) Assignee: Dai Nippon Printing Co. Ltd., Tokyo (JP)

( * ) Notice: Subject to any disclaimer, the term of this patent is extended or adjusted under 35 U.S.C. 154(b) by 1222 days.

(21) Appl. No.: 11/921,590

(22) PCT Filed: Jun. 5, 2006
(Under 37 CFR 1.47)

(86) PCT No.: PCT/JP2006/311217
§ 371 (c)(1),
(2), (4) Date: Sep. 3, 2009

(87) PCT Pub. No.: WO2006/132178
PCT Pub. Date: Dec. 14, 2006

(65) Prior Publication Data
US 2010/0214589 A1    Aug. 26, 2010

(30) Foreign Application Priority Data
Jun. 7, 2005    (JP) ................................. 2005-167086

(51) Int. Cl.
G06F 3/12 (2006.01)
G06K 15/00 (2006.01)
G06F 21/60 (2013.01)

(52) U.S. Cl.
CPC .................................... *G06F 21/608* (2013.01)
USPC ........................... 358/1.14; 358/1.1; 358/1.15

(58) Field of Classification Search
CPC ................................................... G06F 21/608
See application file for complete search history.

(56) References Cited

U.S. PATENT DOCUMENTS

| 7,443,527 | B1 | 10/2008 | Shigeeda | |
|---|---|---|---|---|
| 2002/0154332 | A1* | 10/2002 | Inai et al. | 358/1.15 |
| 2004/0049684 | A1* | 3/2004 | Nomura et al. | 713/182 |
| 2004/0125402 | A1* | 7/2004 | Kanai et al. | 358/1.15 |
| 2004/0187022 | A1* | 9/2004 | Asada et al. | 713/200 |
| 2004/0213612 | A1 | 10/2004 | Hanaoka | |
| 2005/0114696 | A1 | 5/2005 | Hashimoto | |

FOREIGN PATENT DOCUMENTS

| CN | 1479197 | 3/2004 |
|---|---|---|
| CN | 1501202 | 6/2004 |
| EP | 0929023 | 7/1999 |
| JP | 4-277855 | 10/1992 |
| JP | 7-152520 | 6/1995 |
| JP | 8-155277 | 6/1996 |
| JP | 2004-102708 | 4/2004 |
| JP | 2004-118709 | 4/2004 |
| JP | 2004-144789 | 5/2004 |
| JP | 2004-358860 | 12/2004 |
| JP | 2005-11131 | 1/2005 |
| JP | 2005-115519 | 4/2005 |

* cited by examiner

*Primary Examiner* — Marivelisse Santiago Cordero
*Assistant Examiner* — Moustapha Diaby
(74) *Attorney, Agent, or Firm* — Dilworth & Barrese, LLP.

(57) ABSTRACT

A printing system and a program ensuring an improved security. A printing system (1) has printers (20A, 20B, 20C) for printing according to printing data further having a printer managing device (30) having a printing data managing section (311) for limiting the printing data supplied to the printers (20A, 20B, 20C) to printing data having a security level matching the security level based on the installation environment of the printer (20A) and a communication section (34) for providing the limited printing data to the printer (20A).

8 Claims, 8 Drawing Sheets

| PRINT DATA MANAGEMENT INFORMATION | | | | | | | | | | | |
|---|---|---|---|---|---|---|---|---|---|---|---|
| PRINT DATA IDENTIFICATION INFORMATION | | | | | | SECURITY | USER IDENTIFICATION INFORMATION | | PRINT SETTING INFORMATION | ... | |
| No. | DATE AND TIME RECEIVED | PCID | FILE NAME | PAGE NUMBER | SIZE | STORAGE LOCATION | LEVEL | USER NAME | EMPLOYEE NUMBER | ... | ... |
| 472 | 13:41:23 | 123 | ACCOUNTING.txt | 4~6 | 15KB | 01AA0123 | 1 | PARTY A | 123-45678 | ... | ... |
| 473 | 13:43:31 | 111 | PROPOSAL.doc | 1~121 | 2638KB | 02BB1234 | 2 | PARTY B | 111-11111 | ... | ... |
| 474 | 13:43:56 | 123 | NOTE.txt | 1 | 16KB | 06AB4321 | 3 | PARTY A | 123-45678 | ... | ... |
| 475 | 13:44:07 | 123 | ACCOUNTING.txt | 8 | 7KB | 06CC3210 | 1 | PARTY A | 123-45678 | ... | ... |
| : | : | : | : | : | : | : | : | : | : | : | : |

| PRINTER APPARATUS MANAGEMENT INFORMATION | | | |
|---|---|---|---|
| PRINTER APPARATUS IDENTIFICATION INFORMATION | SECURITY LEVEL | ... | |
| PRINTER APPARATUS A | 20A | 2 | ... |
| PRINTER APPARATUS B | 20B | 1 | ... |
| PRINTER APPARATUS C | 20C | 3 | ... |
| : | : | : | : |

FIG. 2A

| | PRINT DATA MANAGEMENT INFORMATION | | | | | | | | |
|---|---|---|---|---|---|---|---|---|---|
| | PRINT DATA IDENTIFICATION INFORMATION | | | | | | SECURITY | USER IDENTIFICATION INFORMATION | | PRINT SETTING INFORMATION |
| No. | DATE AND TIME RECEIVED | PCID | FILE NAME | PAGE NUMBER | SIZE | STORAGE LOCATION | LEVEL | USER NAME | EMPLOYEE NUMBER | |
| 472 | 13:41:23 | 123 | ACCOUNTING.txt | 4~6 | 15KB | 01AA0123 | 1 | PARTY A | 123-45678 | |
| 473 | 13:43:31 | 111 | PROPOSAL.doc | 1~121 | 2638KB | 02BB1234 | 2 | PARTY B | 111-1111 | |
| 474 | 13:43:56 | 123 | NOTE.txt | 1 | 10KB | 06AB4321 | 3 | PARTY A | 123-45678 | |
| 475 | 13:44:07 | 123 | ACCOUNTING.txt | 8 | 7KB | 06CC3210 | 1 | PARTY A | 123-45678 | |
| ... | ... | ... | ... | ... | ... | ... | ... | ... | ... | ... |

FIG. 2B

| PRINTER APPARATUS MANAGEMENT INFORMATION | | |
|---|---|---|
| PRINTER APPARATUS IDENTIFICATION INFORMATION | PRINTER APPARATUS | SECURITY LEVEL |
| PRINTER APPARATUS A | 20A | 2 |
| PRINTER APPARATUS B | 20B | 1 |
| PRINTER APPARATUS C | 20C | 3 |
| ... | ... | ... |

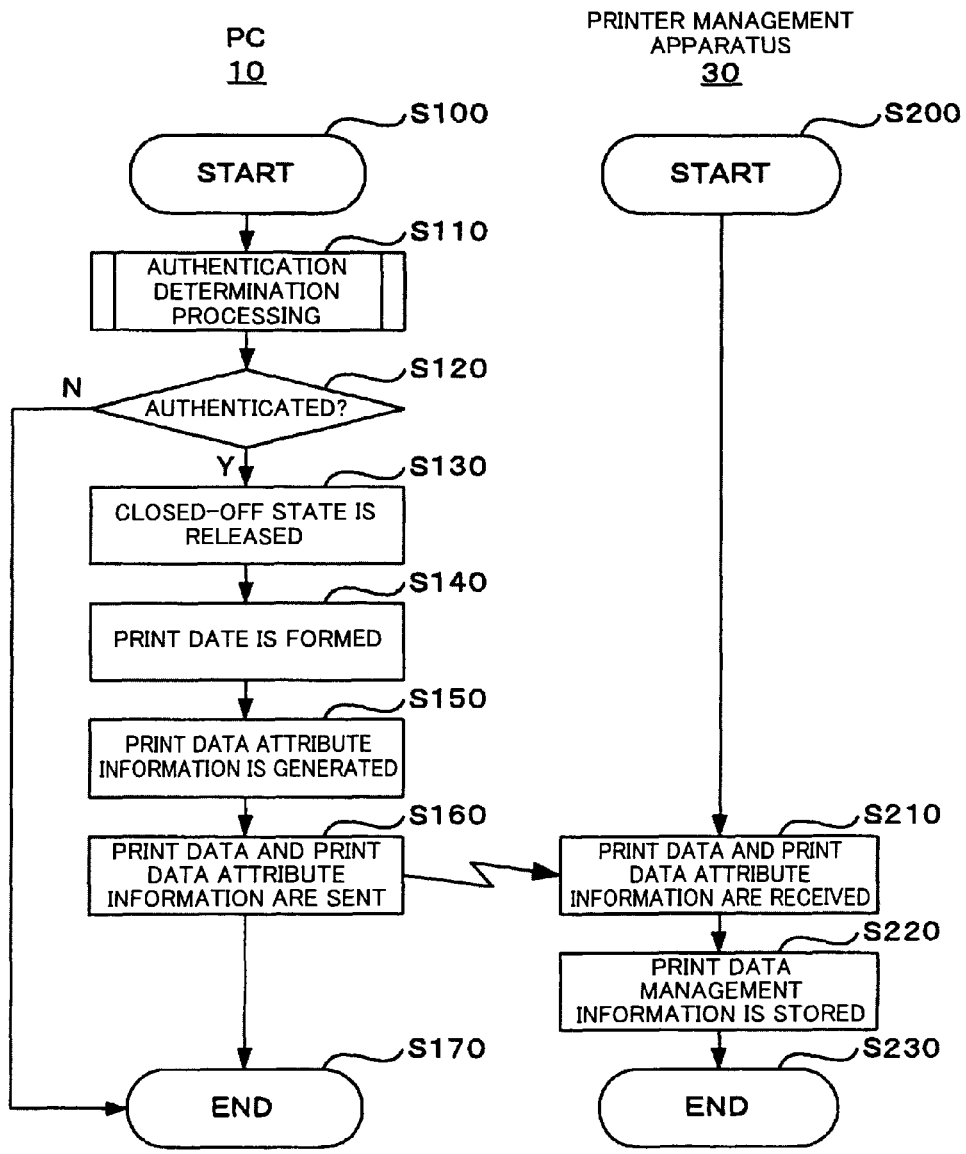

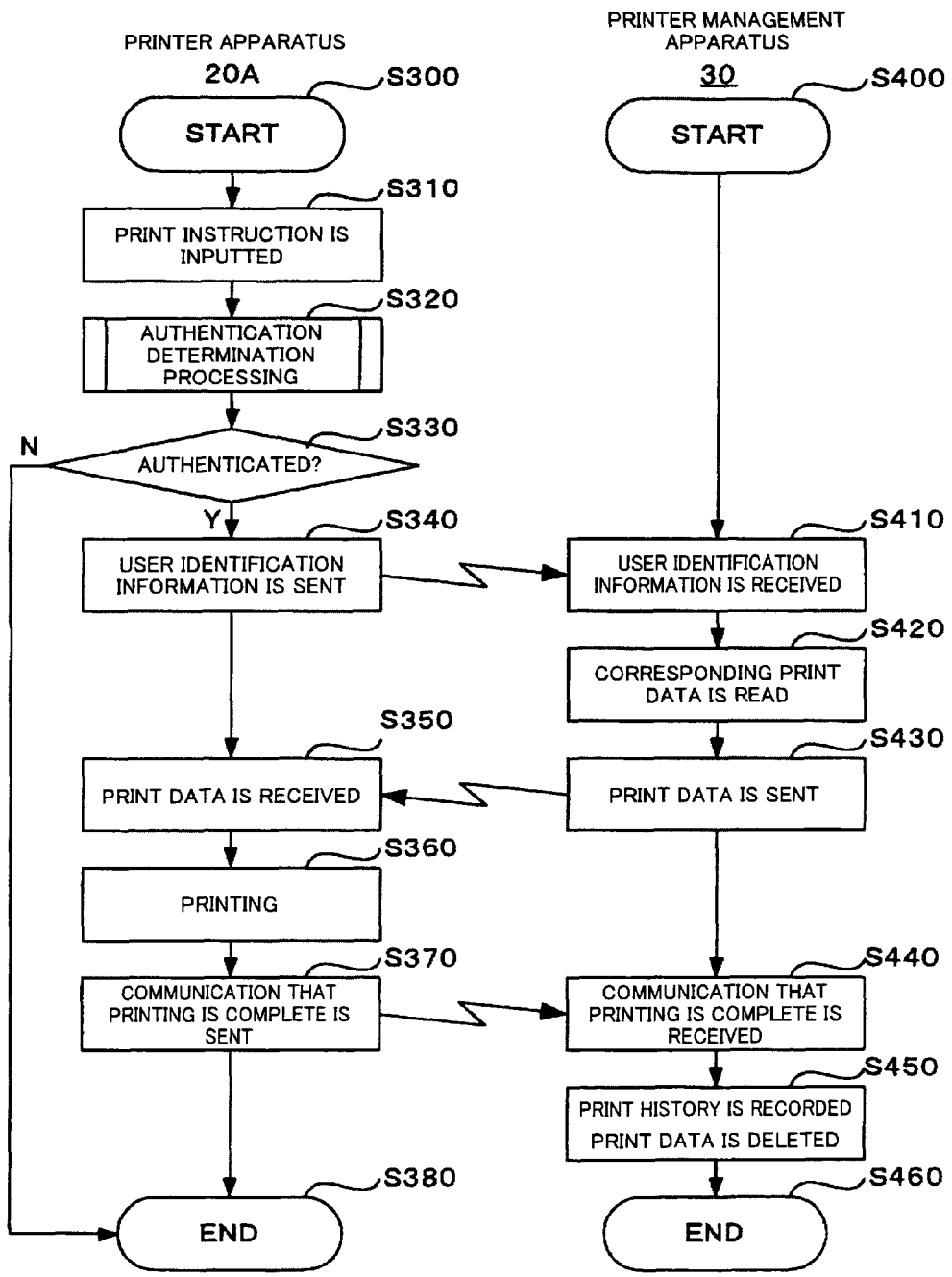

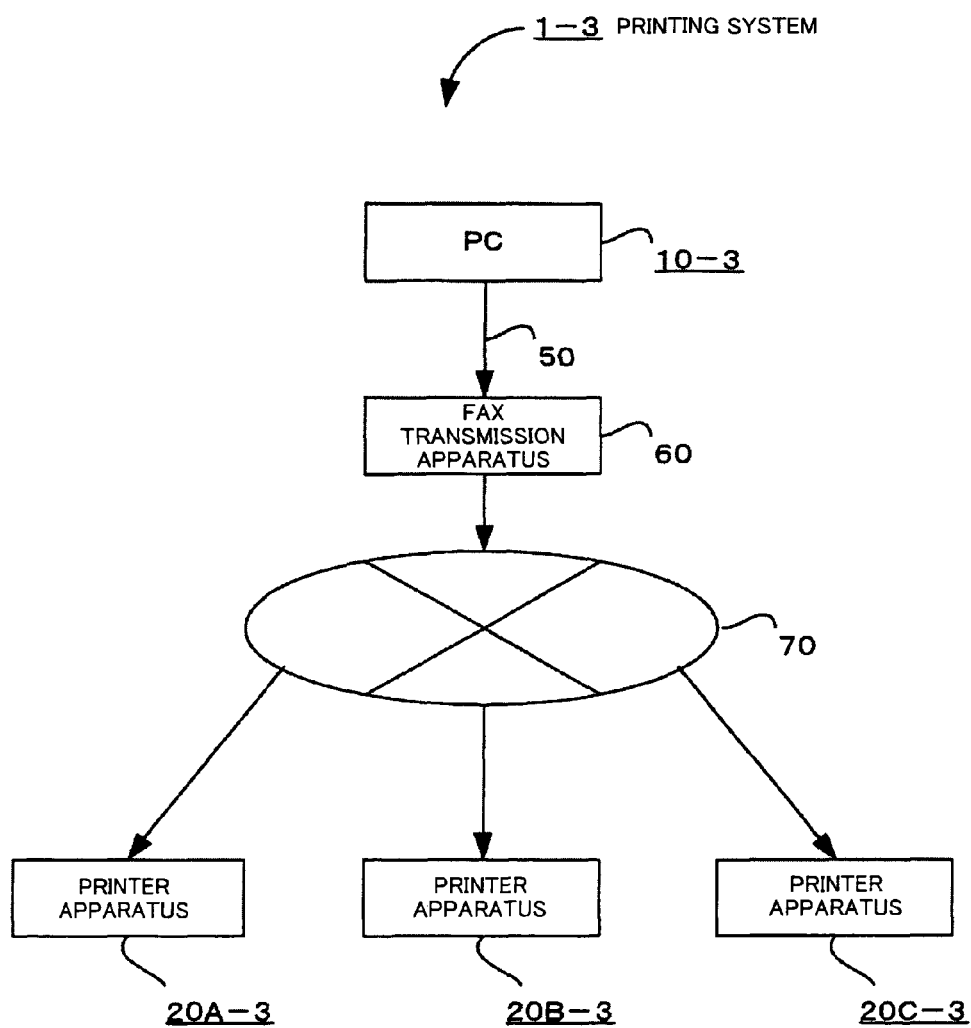

PRINTING SYSTEM AND PROGRAM

TECHNICAL FIELD

The present invention relates to a system equipped with a printing means for carrying out printing based on print data, and a program executable by a computer for managing print data supplied to the printing means carrying out printing based on the print data.

BACKGROUND ART

Printer apparatuses exist that are capable of trusting instructions to start outputting of print information transferred from a host as instructions from regular users only on the printer apparatus side in order to maintain confidentiality of content printed by the printer apparatus. This is achieved by controlling an output destination of image data generated in accordance with output restriction data in received print information (for example, refer to patent document 1).

Patent Document 1: Japanese Unexamined Patent Application Publication No. Hei7-152520

DISCLOSURE OF THE INVENTION

Problems to be Solved by the Invention

However, the printer apparatus may be installed in a variety of environments and security attributes such as a security level may, therefore, vary substantially according to the environment where each printer apparatus is installed. For example, the security level of a printer apparatus installed in locations such as locations that are usually monitored by a video camera and locations where a number of observers such as a number of company employees are present is high. However, the security level of a printer apparatus installed in locations such as meeting rooms where the number of observers is almost non-existent and locations where outsiders frequently enter and exit is low. The security level of print data printed by each user also differs widely depending on whether the print data is strictly confidential, restricted, for internal use only, or data upon which no restrictions are placed such as data for test sheet use. It is therefore possible that printer apparatus of a low security level may be utilized illegally, and it is highly likely that this illegal usage may not be noticed. The possibility of print data leaking or being falsified, etc. is, therefore, high when highly confidential print data is sent to this printer apparatus, which is detrimental to security.

The present invention, therefore, overcomes the problem by providing a printing system and program that improves security.

Means for Solving the Problems

The present invention solves the problems described above using the resolving means described below. A description is provided while assigning corresponding numerals to embodiments of the present invention for ease of understanding, but this is by no means limiting. In a first aspect of the invention, a printing system (1, 1-2, 1-3) having a printing means (28) carrying out printing based on print data has a print data restricting means (311, 213) for restricting the print data supplied to the printing means to print data having security attributes corresponding to security attributes based on an installation environment of the printing means.

According to a second aspect of the invention, in the printing system according to the first aspect of the invention, a printing system (1, 1-2, 1-3) is provided in which the print data restricting means restricts the print data supplied to the printing means to print data having security attributes corresponding to further security attributes of a time band of the printing means.

In a third aspect of the invention, a printing system (1, 1-2, 1-3) is provided, which is similar to the printing system according to the first aspect of the invention, characterized in that the print data restricting means is provided with a determination means (311, S420, 213, S520) for determining whether to provide the print data to the printing means based on the security attributes of the print data and the security attributes of the printing means.

According to a fourth aspect of the invention, a printing system (1, 1-3) is provided, which is similar to the printing system according to the first aspect of the invention, characterized with an authentication information input means (24) for inputting authentication information for authenticating print instruction authority of a user carrying out print instructions and an authentication means (211) for authenticating the print instruction authority of the user based on authentication information inputted by the authentication information input means (211). The print data restriction means restricts print data supplied to the print means to within the range of print instruction authority authenticated by the authentication means.

According to a fifth aspect of the invention, a printing system (1, 1-3) is provided, which is similar to the printing system according to the fourth aspect of the invention, characterized with a portable information storage medium carried by a user for storing user identification information for identifying the user (40). The authentication information input means inputs authentication information for authenticating the print instruction authority of the user from the portable information storage medium of the user.

According to a sixth aspect of the invention, a printing system (1, 1-3) is provided, which is similar to the printing system according to the first aspect of the invention, characterized with a plurality of printer apparatuses (20A, 20B, 20C), and a print data supplying apparatus (30) for supplying print data to the plurality of printer apparatuses. The print data supplying apparatus is provided with a printer apparatus attribute storage means (33) for storing security attributes of each printer apparatus of the plurality of printer apparatuses. The print data restricting means (311, S420) provided at the print data supplying apparatus restricts the print data supplied to each printer apparatus to print data having security attributes corresponding to the security attributes of each printer apparatus stored in the printer apparatus attribute storage means. The print data supplying apparatus supplies the print data restricted by the print data restricting means to each printer apparatus. The printing means provided at each printer apparatus of the plurality of printer apparatuses carries out printing based on the print data supplied by the print data supplying apparatus.

According to a seventh aspect of the invention, a printing system (1, 1-3) is provided, which is similar to the printing system according to the sixth aspect of the invention, characterized in that the printer apparatus has a print instruction input means (26) for inputting print instructions of a user, a target print data identifying information input means (24) for inputting target print data identification information for identifying print data that is a target of a print instruction inputted by the print instruction input means, and a target print data identifying information transmission means (25) for transmitting target print data identifying information inputted by the target print data identifying information input means to the print data supplying apparatus. The print data supplying apparatus has a target print data identifying information receiving means (34) for receiving target print data identifying information from the printer apparatus. The print data restricting means has a determination means (311, S420) for determining whether to supply the print data to the printer apparatus based on security attributes for the print data identified using the target print data identification information received by the target print data identification information receiving means and security attributes of the printer apparatus that is the source of transmission of the target print data identification information. The print data supplying apparatus supplies the print data to the printer apparatus in the event of an affirmative determination by the determination means (S430).

According to an eighth aspect of the present invention, a printing system (1, 1-2, 1-3) is provided, which is similar to the printing system according to the sixth aspect of the invention, characterized in that the print data supplying apparatus is provided with a print attribute setting means (112, 112-2) for performing setting of print attributes that are setting of security attributes for the print data and/or selection of printer apparatus carrying out printing, in accordance with user instructions. The print data restricting means restricts the range of print attributes that can be set by the print attribute setting means based on the correlation of security attributes of the print data and security attributes of the printer apparatus stored in the printer apparatus attribute storage means.

According to a ninth aspect of the invention, a program executable on a computer (31, 21-2) for managing print data supplied to a printing means (28) performing printing based on print data includes a print data restricting step (S420, S520) of restricting the print data supplied to the printer apparatus to print data having security attributes corresponding to security attributes based on an installation environment of the printing means, and a print data supplying step (S360, S430, S530) of supplying print data restricted in the print data restricting step to the printing means.

According to a tenth aspect of the invention, in the program of the ninth aspect of the invention, a program is provided in which the print data restricting step restricts the print data supplied to the printing means to print data having security attributes corresponding to further security attributes of a time band of the printing means.

According to an eleventh aspect of the invention, in the program of the ninth aspect of the invention, the print data restricting step is provided with a determination step (S420, S520) for determining whether to provide the print data to the printing means based on the security attributes of the print data and the security attributes of the printing means.

Effects of the Invention

According to the printing system and program according to the present invention, the following results can be achieved.

(1) By determining whether or not it is possible to supply print data to the printing means based on security attributes related to the installation environment of the printing means and security attributes for the print data, it is possible to prevent leaking and falsification and improve the security of print data by restricting print data supplied to a printing means to print data having security attributes corresponding to security attributes based on the installation environment of the printing means. In particular, at the print data supplying apparatus supplying print data to the printer apparatus such as a PC or server, in the event of restricting the providing of the print data, print data of a high degree of confidentiality is not supplied to a printer apparatus of a low security level. It is, therefore, possible to restrict print data supplied to the printer apparatus according to security attributes, leaking and falsification of print data can be prevented, and security can be improved. Furthermore, in the case of restricting supplying of print data to the printing means at the printer apparatus, it is also possible to further improve security by enabling the printing of only print data of a security level corresponding to the security level of the printer apparatus in the event that a print data supplying apparatus not referenced to a domain such as a notebook computer brought in from outside by a company employee is connected to the printer apparatus and printing is carried out.

(2) It is also possible to dramatically improve security by restricting the print data supplied to the printing means to print data having security attributes corresponding to further security attributes of a time band of the printing means.

(3) It is possible to improve security by restricting print data supplied to the printing means to within the range of the print instruction authority of the authenticated user.

(4) It is possible to enable the user to input authentication information in a straightforward manner and for usefulness for the user to be improved by inputting authentication information from the portable information storage medium.

(5) It is possible for the user to carry out printing at the printer apparatus in a manner corresponding to the security attributes of the print data so as to make it possible to improve security by supplying print data having security attributes corresponding to the security attributes of each printer apparatus of the plurality of printer apparatuses to each printer apparatus.

(6) It is possible to carry out printing even if the print data is not stored in the printer apparatus in advance and security can, therefore, be improved by acquiring target print data that is the subject of the print instruction from the print data supplying apparatus for printing. Furthermore, it is no longer necessary for the user to designate the printer apparatus at a print data supplying apparatus such as a PC, etc. because the print data is acquired by the printer apparatus and usefulness can, therefore, be improved. Moreover, the user can carry out printing by going to the location of an arbitrary printer apparatus of the plurality of printer apparatuses and confirming whether use is possible. This improves the usefulness for the user, prevents the forgetting of collection of the printed matter or leakage of printed content to other users, and makes it possible to improve security. When one printer apparatus cannot be used, it is possible to proceed to the location of a further printer apparatus without returning to the print data supplying apparatus and then carry out printing by similarly confirming the state of the printer apparatus. This improves usefulness for the user. On the other hand, it is also possible to improve security by having the print data supplying apparatus supply this print data in the event that the security attributes of the print data that is the subject of a print instruction correspond to the security attributes of the printer apparatus.

(7) As a result of restricting the range of print attributes, it is possible to set for the print data supplying apparatus, it is possible to set print attributes corresponding to the correlation of the print data and the security attributes of the printer apparatus, the occurrence of errors can be prevented, and usefulness for the user is improved.

BRIEF DESCRIPTION OF THE DRAWINGS

FIG. 2 is a view illustrating print data management information and printer apparatus management information stored in an external storage device 33; (First Embodiment)

FIG. 3 is a flowchart showing the operation of a printing system and a program according to the present invention; (First Embodiment)

FIG. 4 is a flowchart further showing the operation of the printing system and a program according to the present invention; (First Embodiment)

FIG. 8 is a block view showing a configuration of the printing system according to the present invention (Modified Example).

Figure 1:
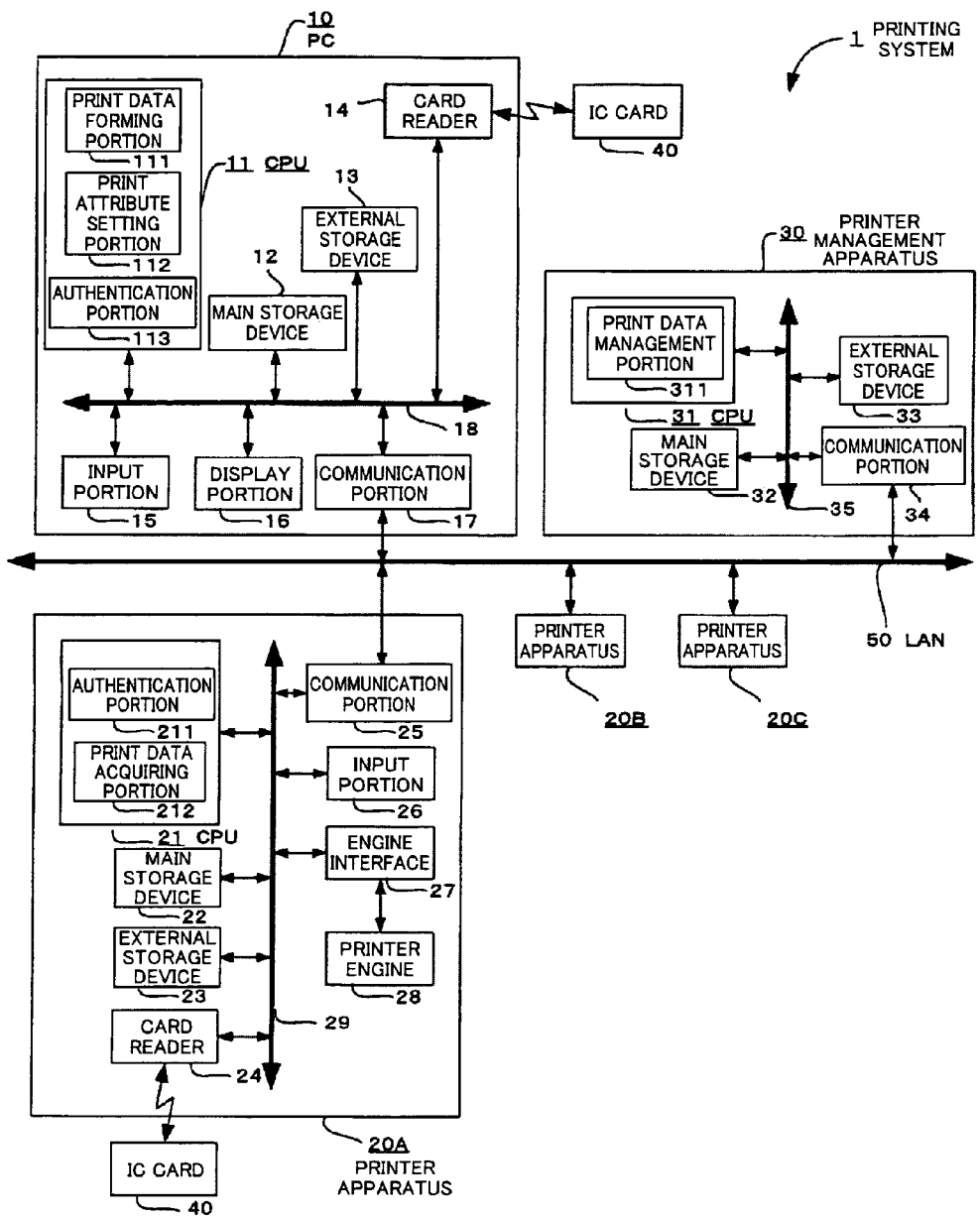
FIG. 1 is a block view showing a configuration of a printing system according to the present invention; (First Embodiment)

EXPLANATION OF REFERENCE NUMERALS 1, 1-2, 1-3 printing system
10, 10-2, 10-3 PC
11, 11-2 CPU
14 card reader
15 input portion
17 communication portion
20A, 20B, 20C, 20A-2, 20B-2, 20C-2, 20A-3, 20B-3, 20C-3 printer apparatus
21, 21-2 CPU
23, 23-2 external storage device
24 card reader
25 communication portion
26 input portion
28 printer engine
30 printer management apparatus
31 CPU
34 communication portion
40 IC card
50 LAN
111 print data forming portion
112, 112-2 attribute information generating portion
113 authentication portion
211 authentication portion
212 print data managing portion
213 print data acquiring portion
311 print data managing portion

PREFERRED MODE FOR CARRYING OUT THE INVENTION

With the object of improving security, a printing system according to the present invention having a printing means for carrying out printing based on print data is provided with a print data restricting portion for restricting print data supplied to the printing means to print data having security attributes corresponding to security attributes based on the installation environment of this printing means, and a print data supplying portion for supplying print data restricted by the print data restricting portion to the printing means.

First Embodiment

The following is a detailed description with reference to the drawings of embodiments of the present invention. FIG. 1 is a block view showing a configuration of a printing system according to the present invention. As shown in FIG. 1, a printing system 1 is provided with a PC10 connected via a LAN 50, a plurality of printer apparatuses 20A, 20B and 20C, a printer management apparatus 30, and an IC card 40 carried by the user that is capable of being connected to the printer apparatus 20A, 20B and 20C, etc. The printer apparatus 20A, 20B and 20C carries out printing based on print data formed by the PC10. The printing system 1 is a network system such as a company-wide network. The LAN 50 is a local area network provided within a predetermined area such as within a portion or a department of a company and may be configured from an Ethernet (registered trademark), etc.

The PC10 is a computer provided with a CPU 11 and a main storage device 12, an external storage device 13, a card reader 14, an input portion 15, a display portion 16 and a communication portion 17, etc. connected to the CPU 11 via a system bus 18. The CPU 11 executes programs such as an operating system (hereinafter referred to as "OS"), application programs and print drivers stored in the main storage device 12 and the external storage device 13, controls overall operation of the PC10, so as to implement a print data forming portion 111, a print attribute setting portion 112, and an authentication portion 113, etc. The print data forming portion 111 executes document production software, edits and produces data, decides the range of data to be the subject of printing, and forms print data in accordance with operation of the input portion 15 by the user.

The print attribute setting portion 112 sets print attributes for print data formed by the print data forming portion 111 and generates print data attribute information indicating the print attributes in accordance with operation of the input portion 15 by the user. The print data attribute information is information indicating attributes of the print data and includes information such as print data identification information for identifying this print data, user identification information for identifying a user instructing formation of the print data, a security level, and print setting information. The print data identification information is information for identifying this print data and includes the name of the file the print data formed by the print data forming portion 111 originates from and page numbers indicating the range of data within the file. The user identification information is information for identifying a user instructing the formation of the print data and includes a user name and employee number. The print setting information is information indicating printing specifications set by the user such as printing color, quality, and number of sheets printed. The security level is information indicating the level of confidentiality of the print data and is set according to the confidentiality of each item of print data such as documents that are digitally signed, and print data for documents that are strictly confidential, restricted, for internal use only (refer to FIG. 2 in the following).

The authentication portion 113 determines whether or not a user in the possession of the IC card 40 is a rightful user having the authority to use the PC10, i.e. carries out authentication determination processing for determining whether to authenticate the user, based on authentication information inputted from the IC card 40 installed in the card reader 14. For example, the authentication portion 113 first carries out mutual authentication with the IC card 40 and determines whether the IC card 40 is authentic. After confirming the validity of the IC card 40, the authentication portion 113 reads out user identification information and user attribute identification information, etc., from the IC card 40. The authentication portion 113 then determines whether or not the user has the authority to use the PC10. Namely, the authentication portion 113 carries out determinations based on whether or not user identification information and user attribute identification information read from the IC card 40 is contained in a list of user identification information or user attribute information of rightful users stored in an external storage device 13 of the PC10 or stored in a system management server (not shown) connected to the LAN 50. When consent is determined, the authentication portion 113 authenticates the person in possession of the IC card 40 as a rightful user. When the user has yet to be authenticated by the authentication portion 113, the PC10 maintains a closed off state where the user cannot use the screen, such as keeping the screen locked with the PC10, then releasing this closed state to enable use by the user when the user is authenticated.

The main storage device 12 is a storage device that can be directly used by the CPU 11 and is provided with RAM used as a work region for the CPU 11, programs such as activation programs, and ROM for storing data, etc. (not shown). The external storage device 13 is a hard disc, etc. for storing various programs such as programs for carrying out user authentication and programs for making and forming print data, and data. The card reader 14 is a communication interface for carrying out communication with the inserted IC card 40. The input portion 15 is an input apparatus such as a keyboard and mouse for transmitting information from the user to the PC10. The display portion 16 is a display apparatus such as a display, etc. for transmitting information from the PC10 to the user. The communication portion 17 is a communication interface connecting the PC10 to the LAN 50 for transmitting print data to the printer apparatuses 20A to 20-N for bringing about communication with other communication apparatuses via a network such as the LAN 50.

Each printer apparatus 20A, 20B, and 20C is installed in a different environment. There are various possibilities for the configurations of each printer apparatus 20A, 20B, and 20C; however, it is possible to consider the configuration of each printer apparatus 20A, 20B, and 20C to be substantially the same in configuration according to the present invention. A description is, therefore, provided of the configuration of printer apparatus 20A, and the configuration of the other printer apparatuses 20B and 20C is not described. The number of printer apparatuses 20A, 20B, and 20C that are provided with the printing system 1 is by no means limited to three and may be any plurality. The same also applies to the second embodiment. The printer apparatus 20A is a printer apparatus provided with a CPU 21, a main storage device 22 connected to the CPU 21 via a system bus 29, an external storage device 23, a card reader 24, a communication portion 25, an input portion 26 and an engine I/F 27, and a printer engine 28 connected to the engine I/F 27.

The CPU 21 controls the overall operation of the printer apparatus 20A by executing programs stored in the main storage device 22 and the external storage device 23 so as to implement an authentication portion 211 and print data management portion 212, etc. The authentication portion 211 carries out authentication determination processing to determine whether a user in possession of the IC card 40 is a rightful user having the authority to use the printer apparatus 20A based on authentication information inputted from the IC card 40 installed in the card reader 24, in the same way as for the authentication portion 113 of the PC10. The print data acquiring portion 212 transmits user identification information for identifying a user carrying out a print instruction, makes a request for the providing of print data to the printer management apparatus 30, and acquires print data corresponding to the user identification information from the printer management apparatus 30 (refer to FIG. 4 described later). The main storage device 22 and the external storage device 23 are provided with the same functions as the main storage device 12 and the external storage device 13 of the PC10 and ROM of the main storage device 22 stores data such as character codes outputted by the printer engine 28.

The card reader 24 is a communication interface for carrying out communication with the inserted IC card 40. The communication portion 25 is a communication interface connecting the printer apparatus 20A to the LAN 50 for receiving print data from PC10 to PC10-N, and brings about communication with other communication apparatuses via a network such as the LAN 50. The input portion 26 is an input apparatus such as a key panel for transmitting information from a user to the printer apparatus 20A. The engine I/F 27 is an interface for mediating in the exchange of information between the system bus 29 and the printer engine 28, and outputting print data to the printer engine 28. The printer engine 28 executes printing based on print data supplied via the engine I/F 27.

The printer management apparatus 30 is an information processing apparatus equipped with a CPU 31, and a main storage device 32, an external storage device 33, and a communication portion 34 connected to the CPU 31 via a system bus 35. The printer management apparatus 30 carries out management of the print data such as storing of print data formed by the PC 10 and supplying the print data to the printer apparatus 20A, 20B, and 20C as necessary. The main storage device 32 and the external storage device 33 are provided with the same functions as the main storage device 22 and the external storage device 23 of the printer apparatus 20A, with the external storage device 33 storing print data management information, printer apparatus management information, print history, etc.

FIG. 2 is a view illustrating print data management information and printer apparatus management information stored in an external storage device 33. As shown in FIG. 2(a), the print data management information is information associating print data identification information such as a print data serial number for enabling the printer management apparatus 30 to identify the print data, a date and time of receiving the print data, identification information (PCID) for the PC 10 that formed the print data, print data size, a storage location (address, etc.) with print data attribute information received from the PC 10.

As shown in FIG. 2(b), the printer apparatus management information is information indicating attributes of each of the printer apparatus 20A, 20B, and 20C under the management of the printer management apparatus 30 and is information associating security levels, etc. with printer apparatus identification information that is identification information for the printer apparatus 20A, 20B, and 20C. The security level indicates the security level of each of the printer apparatuses 20A, 20B, and 20C, and is a level of security (safety) at installation environments for each of the printers 20A, 20B, and 20C that is set according to the presence or absence of observers or observation equipment, etc., degree of reliability of the observers, and the presence or absence of people entering from outside, etc. For example, printer apparatus 20A is located in a location where a number of observers such as a number of company employees are present. Printer apparatus 20B is located in a location that is always monitored by a video camera. Printer apparatus 20C is located in a location such as a meeting room where there are rarely any observers. Each security level is therefore set as "2", "1", and "3", respectively. In this embodiment, the security level is set so that "1" is the highest (highest degree of safety), with the numerical value increasing as the degree of safety decreases. In the event that a new printer apparatus is installed and connected to the LAN 50, printer apparatus management information is recorded in the external storage device 33 of the printer management apparatus 30.

The CPU 31 controls the overall operation of the printer management apparatus 30 by executing programs stored in the main storage device 32 and external storage device 33 so as to implement a print data management portion 311, etc. The print data management portion 312 executes processing such as the writing in and reading out of print data management information to and from the external storage device 33, recording of print history, and reading out and erasing of print data so as to carry out management of print data. Furthermore, the print data management portion 312 provides print data having security levels corresponding to the security levels of each of the printer apparatuses 20A, 20B, and 20C to each of the printer apparatuses 20A, 20B, and 20C. For example, print data is not supplied to a printer apparatus of a lower security level than the security level of the print data, but print data of a security level that is the security level of a printer apparatus or less is supplied (refer to FIG. 4 in the following).

The IC card 40 is a portable information storage medium carried by the user for use with the printing system 1. A portable information storage medium is a portable information storage medium that stores information in a concealed manner where reading by a predetermined apparatus is possible, and includes an IC card such as a SIM card and a UIM card, an IC tag, a mobile telephone equipped with an IC card function, or a card equipped with a barcode, etc. The IC card 40 stores user identification information for identifying a user such as user name and employee number, user attribute identifying information for identifying attributes of users such as department and official position, and validity certification information such as secret keys, etc. The validity certification information is information for certifying the validity of information stored in the IC card 40 at an external apparatus such as the printer apparatuses 20A, 20B, and 20C.

FIG. 3 is a flowchart showing the operation of a printing system and a program according to the present invention, and shows a print data supplying process for supplying print data from the PC 10 to the printer management apparatus 30. In the following, a description is provided centered on processing of the CPU 11 of the PC 10 and the CPU 31 of the printer management apparatus 30. In order to use the PC 10, a user inserts his or her IC card 40 into the card reader 14. As shown in FIG. 3, in step 110 (in the following, "step" is referred to as "S"), the authentication portion 113 of the PC 10 carries out authentication determination processing based on authentication information such as user identification information inputted from the IC card 40. When the user is authenticated as a rightful user, the PC 10 releases the closed-off state and enters a state enabling use by the user (S120, S130).

The user then operates the input portion 15 to start up applications, edit and produce data for documents and images. etc., and specify a range of data for printing. The print data forming portion 111 then forms the print data (S140). Furthermore, the user then operates the input portion 15 and sets print attributes by designating print color and quality, etc. The print attribute setting portion 112 then generates print data attribute information including user identification information for the user instructing the forming of the print data, print data identification information, print setting information, and security level, etc. (S150). The print data transmission portion 113 sends print data and print data attribute information to the printer management apparatus 30 via the LAN 50 (S160) and processing is completed (S170).

The printer management apparatus 30 receives this print data and print data attribute information (S210). The print data management portion 311 then stores the print data and the print data management information generated from the print data attribute information in the external storage device 33 (S220), and processing is completed (S230).

FIG. 4 is a flowchart showing the operation of a printing system and a program according to the present invention, and shows print processing where printing is carried out according to instructions from a user based on print data supplied from the PC 10 to the printer management apparatus 30 in print data supplying processing (refer to FIG. 3). The following is a description centered on processing of the CPU 21 of the printer apparatus 20A and the CPU 31 of the printer management apparatus 30. The user instructing the forming of print data at the PC 10 then extracts the IC card 40 from the IC card reader 14 of the PC 10. The user then proceeds to an arbitrary printer apparatus 20A at which it is wished to print such as a printer apparatus that is not in use that is close to the PC 10. The IC card 40 is then installed into the card reader 24, the input portion 26 is operated, and the print instructions are carried out.

As shown in FIG. 4, in step S310, the printer apparatus 20A is inputted with an instruction to print, and authentication information including user identification information for identifying the user carrying out the print instruction is inputted from the IC card 40. The authentication portion 211 carries out authentication determination processing based on the authentication information (S320). When the user is authenticated as being a rightful user, the print data acquiring portion 213 sends a print data supplying request requesting the supply of corresponding print data including user identification information inputted from the IC card 40 and printer apparatus identification information for identifying the printer apparatus 20A from the communication portion 25 to the printer management apparatus 30 (S330, S340).

The printer management apparatus 30 then receives this request and starts processing (S410). The print data management portion 311 refers to print data management information, and printer apparatus management information stored in the external storage device 33, and reads out print data satisfying the security conditions within the range of print instruction authority of the user "party A" carrying out the print instruction from the external storage device 33 (S420). Specifically, the print data management portion 311 reads out print data that is correlated with received user identification information (party A), and less than or equal to the security level ("2") of the printer apparatus 20A of the source of the request (print data for No. 474). The print data for No. 472 and No. 475 is of a security level of "1" and is, therefore, not supplied to printer apparatus 20A of a security level of "2". The printer management apparatus 30 then sends the read out print data to the printer apparatus 20A that is the source of the transmitted request (S430).

The printer apparatus 20A then receives the print data (S350), outputs this print data to the printer engine 28 and prints the print data (S360), sends a communication indicating this to the printer management apparatus 30 after completion of the printing (S370), and ends processing (S380). The printer management apparatus 30 receives a communication that printing is complete from the printer apparatus 20A (S440), writes a print history to the external storage device 33, and deletes the print data that was the target of printing from the external storage device 33 (S450), and ends processing (S460). Other printer apparatuses 20B and 20C also carry out printing processing in the same way as the printer 20A in the event that the user carries out printing at either of the other printer apparatuses 20B and 20C. When the print data has not been a target of a print instruction (S310 of FIG. 4) for at least a predetermined period from being received from the PC 10 (S210 of FIG. 3), the print data management portion 311 of the printer management apparatus 30 erases the remaining print data from the external storage device 33, and stores an indication to this effect in the external storage device 33 as a print history.

In this way, according to this embodiment, the printing system 1 prevents disclosing or falsification of print data and improves security by not providing print data of a high level of confidentiality to the printer apparatuses 20A, 20B, and 20C of a low security level that may be utilized fraudulently because the printer management apparatus 30 supplies to the printer apparatuses 20A, 20B, and 20C print data whose security level corresponds to the security level of the printer apparatuses 20A, 20B, and 20C representing the installation environment of the printer apparatuses 20A, 20B, and 20C. Furthermore, it is possible for the printing system 1 to improve the level of security because when the user carrying out the print instruction is authenticated as the user forming the print data, printing is carried out based on this print data, and the print data is restricted to being supplied to printer apparatuses 20A, 20B, and 20C within the range of print instruction authority of the authenticated user.

As a result of the printing system 1 inputting user identification information that is target print data identification information and authentication information for authenticating the user carrying out the print instruction, it is possible for the user to input the target print data identification information and the authentication information in a straightforward manner and utility for the user is improved. Moreover, because the printing system 1 supplies print data having security levels corresponding to the security levels of each of the plurality of printer apparatuses 20A, 20B, and 20C to each printer apparatus 20A, 20B, and 20C, the user carries out printing using a printer apparatus corresponding to the security level of the print data, and it is possible to improve the level of security. Furthermore, the printing system 1, is such that printer apparatuses 20A, 20B, and 20C are inputted with print instructions so that target print data that is the subject of the print instruction is acquired from the printer management apparatus 30, and printed. This means that it is possible to carry out printing even if the print data is not stored in the printer apparatuses 20A, 20B, and 20C in advance and security can, therefore, be improved.

The printing system 1 is capable of improving utility because it is not necessary for the user to specify the printer apparatus 20A, 20B, or 20C for carrying out printing at the PC 10 because the printer apparatuses 20A, 20B, and 20C acquire the print data. Furthermore, the user can carry out printing by going to the location of an arbitrary printer apparatus 20A of the plurality of printer apparatuses 20A, 20B, and 20C and confirming whether use is possible. This improves the utility for the user, prevents the forgetting of collection of the printed matter or disclosing of printed content to other users, and makes it possible to improve security. Moreover, the user can then go to the locations of the other printer apparatuses 20B and 20C without returning to the PC 10, and can similarly carry out printing by confirming the conditions without returning to the PC 10 when the printer apparatus 20A cannot be used, thereby improving utility for the user.

Second Embodiment

Figure 5:
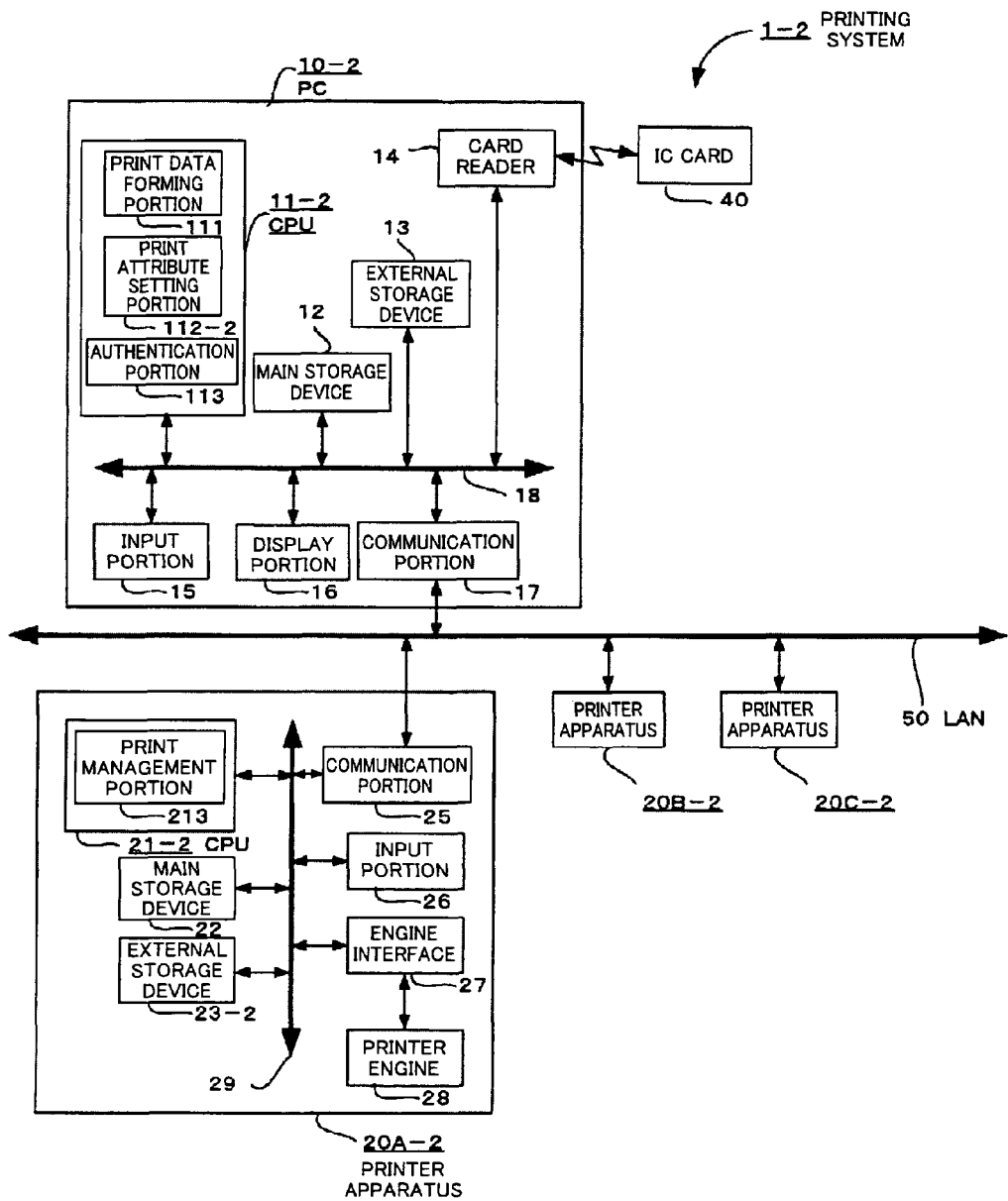
FIG. 5 is a block view showing a configuration of the printing system according to the present invention; (Second Embodiment)

FIG. 5 is a block view showing a configuration of a printing system according to the present invention. Portions performing the same functions as the embodiment described above are assigned the same numerals or are assigned numbers consolidated at the end, and duplicate descriptions and drawings are omitted as appropriate. As shown in FIG. 5, a printing system 1-2 is equipped with a PC 10-2 and a plurality of printer apparatuses 20A-2, 20B-2, 20C-2 connected via the LAN 50, and the IC card 40 connectable to the PC 10-2 so as to form a network system in which the printer apparatuses 20A-2, 20B-2, and 20C-2 carry out printing based on print data formed by the PC 10-2. The PC 10-2 has substantially the same configuration as the PC 10 of the first embodiment, and is provided with a CPU 11-2, etc. The CPU 11-2 implements the print attribute setting portion 112-2, etc. The print attribute setting portion 112-2 selects and sets printer apparatuses for carrying out printing from printer apparatuses 20A, 20B, and 20C in accordance with operations of the input portion 15 by the user. The PC 10-2 then transmits print data and print data attribute information, etc. to the printer apparatuses and instructs printing.

The printer apparatuses 20A-2, 20B-2, and 20C-2 have substantially the same configuration as the printer apparatuses 20A, 20B, and 20C of the first embodiment, and are provided with an external storage device 23-2, a print management portion 213 implemented by a CPU 21-2 executing programs stored in the main storage device 22 and the external storage device 23-2, etc. The external storage device 23-2 stores print data and print data attribute information received from the PC 10-2. Furthermore, the external apparatus 23-2 stores the security level and print history of the printer apparatus 20A-2 provided.

The print management portion 213 executes processing such as writing and reading the print data and the print data attribute information to and from the external storage device 23, outputting to the printer engine 28, deleting, and recording the print history, etc.; manages the print data; and controls printing of the printer engine 28. Furthermore, the print management portion 213 outputs print data having a security level corresponding to the security level of the printer apparatus 20A-2, which the print management portion 213 itself is provided in, i.e. outputs print data of a security level satisfying security conditions based on the security level of the printer apparatus 20A-2 to the printer engine 28. This means that the print management portion 213 does not output to the printer engine 28 and does not carry out printing even though print instruction is received from the PC10-2 as long as print data of a security level is higher than the security level of the printer apparatus 20A-2 (refer to FIG. 6 described in the following).

Figure 6:
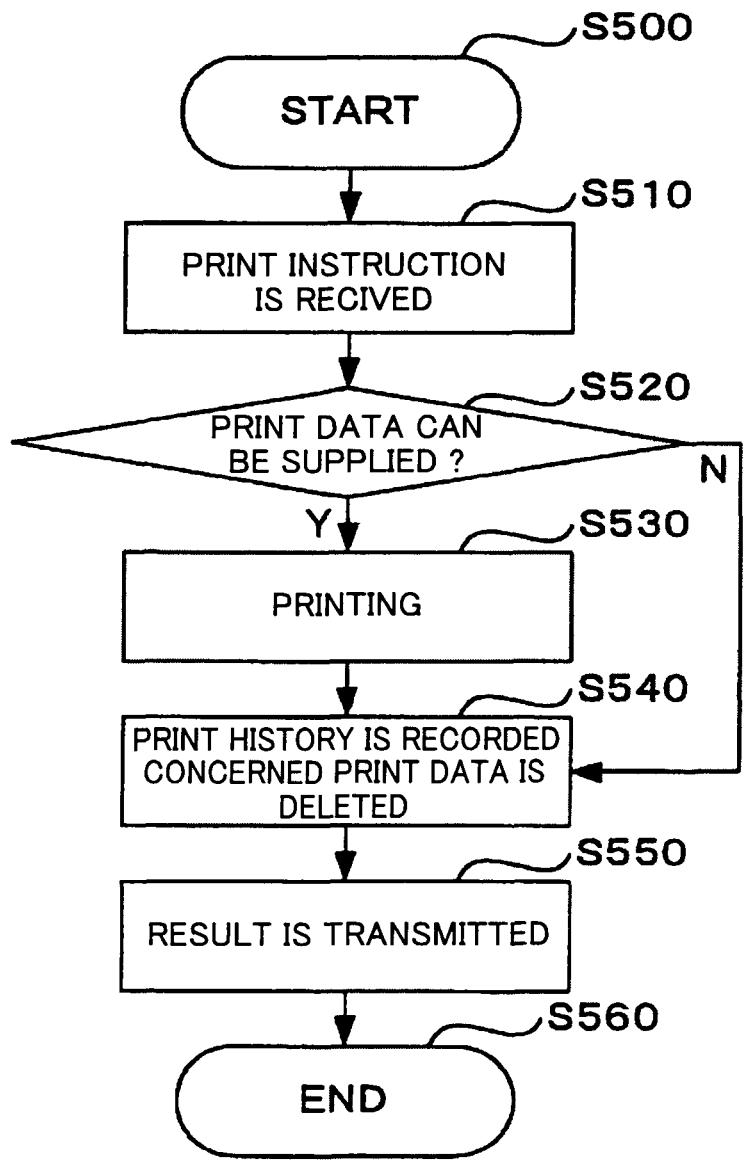
FIG. 6 is a flowchart showing the operation of the printing system and a program according to the present invention; (Second Embodiment)

FIG. 6 is a flowchart showing the operation of a printing system and a program according to the present invention. The following is a description centered on the processing of the CPU 21-2 of the printer apparatus 20A-2. As shown in FIG. 6, the PC 10-2 sends print data and print data attribute information, etc. to the printer apparatus 20A-2 selected by the user, and carries out print instructions. The printer apparatus 20A-2 then receives the print instructions and starts processing (S510). The print management portion 213 then determines whether or not it is possible to supply this print data to the printer engine 28 based on whether or not the security level of the print data contained in the received print data attribute information satisfies the security conditions (S520). When this determination is affirmative, the print management portion 213 outputs this print data to the printer engine 28 and carries out printing (S530).

The print management portion 213 records a print history such as a date and time of printing and a date and time of refused printing, etc. in the external storage device 23, erases print data subjected to printing (or refused printing) from the external storage device 23 (S540), sends the results of printing of "normal completion" (or "error") to the PC 10-2 that is the source of transmitting the print instructions (S550), and ends processing (S560). In the event that print instructions are sent from the PC 10-2 to the other printer apparatuses 20B-2 and 20C-2, the other printers 20B-2 and 20C-2 carry out the same processing as the printer 20A-2.

In this way, according to this embodiment, in addition to the same effects as the first embodiment, it is also possible to further improve security by enabling the printing of only print data of a security level corresponding to the security level of the printer apparatuses 20A-2, 20B-2, and 20C-2 in the event that a print data supplying apparatus not belonging to a domain such as a notebook computer brought in from outside by a company employee is connected to the printer apparatuses 20A-2, 20B-2, and 20C2 for printing.

Modified Example

The present invention is by no means limited to the embodiments described above, and various modification and changes are possible without deviating from the essential scope of the present invention. For example, in each of the embodiments, the printer management apparatus 30 and printer apparatuses 20A-2, 20B-2, and 20C-2 store the security levels for the printer apparatuses 20A, 20B, 20C, 20A-2, 20B-2, and 20C-2, respectively, but it is also possible to store security levels for the printer apparatuses 20A, 20B, 20C, 20A-2, 20B-2, and 20C-2 (collectively referred to as "20A to 20C-2") for different time bands according to time bands, such as outside work time, which has a low security level. It is also possible to supply print data to the printer engine 28 in line with a security level conforming more to the installation environments of the printer apparatuses 20A to 20C-2 and it is, therefore, possible to further improve security.

Figure 7:
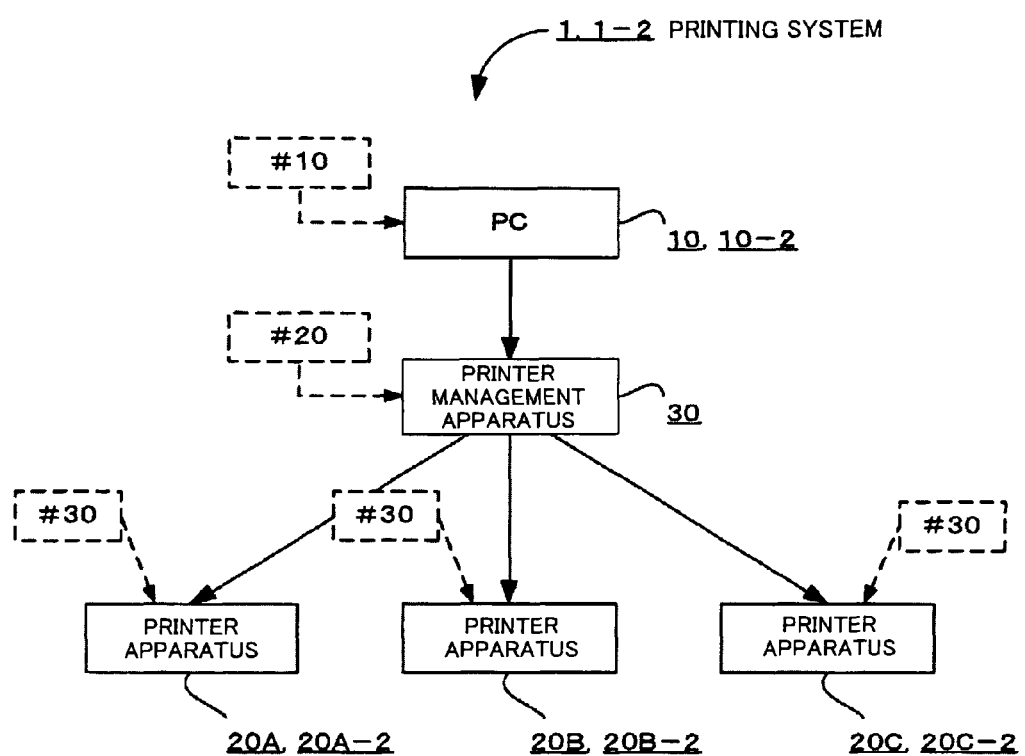
FIG. 7 is a view illustrating exchanging of print data via a LAN 50; (Modified Example)

As shown in FIG. 7, while in the first embodiment and the second embodiment, in printing systems 1 and 1-2, the printer management apparatus 30 or the printer apparatus 20A-2 restrict the print data supplied to the printer engine 28 (#20, #30), it is also possible to store printer apparatus management information at PC 10 or PC 10-2 (#10) and restrict print data supplied to the printing means. For example, when PC 10 and 10-2 restrict the print data supplied to the printer engine 28, it is possible for the print attribute setting portions 112 and 112-2 for setting print attributes to restrict the security levels of print data that can be set through operation of the input portion 15 by the user and restrict the selectable printer apparatuses 20A to 20C-2 based on a correlation of the print data and the security attributes of the printer apparatuses 20A, 20B and 20C a, thereby restricting the print attributes that can be set. It is also possible to set print attributes at conditions for correlation of the print data and the security levels of the printer apparatuses 20A to 20C-2, it is possible to prevent the occurrence of errors when security levels do not correspond, and rapid printing is possible.

Furthermore, in the second embodiment, as with the first embodiment, the printing system 1-2 may also be provided with the printer management apparatus 30 for managing the exchange of print data between the PC 10-2 and the printer apparatuses 20A-2, 20B-2 and 20C-2, and restricting the supply of print data to the printer apparatuses 20A-2, 20B-2, and 20C-2. As long as print data is restricted along the print data supply paths from forming of the print data to supplying to the printer engine 28, the print data may be restricted anywhere.

In each embodiment, the IC card 40 is used as the portable information storage medium by way of example, but this is by no means limiting. For example, other portable information storage media are also possible, providing it is possible to supply authentication information for authenticating the user in possession of the portable information storage medium. The method for communicating between the portable information storage medium and the card readers 14 and 24 is by no means limited and may be, for example, a contact method, a non-contact method, or a contact/non-contact method.

In each embodiment, the printer apparatuses 20A to 20C and 20A-2 to 20C-2 provided with the printing systems 1 and 1-2 may also be printer apparatuses that receive facsimile data and print this facsimile data. As shown in FIG. 8, the printing system 1-3 is comprised of a PC 10-3, a FAX transmission apparatus 60 connected to the PC 10-3 via the LAN 50, etc., and printer apparatuses 20A-3, 20B-3, 20C-3, etc. connected to the FAX transmission apparatus 30-3 via a communication line 70 such as a telephone line, etc. The PC 10-3 and printer apparatuses 20A-3, 20B-3, and 20C-3 have substantially the same configuration as the PC 10 and PC 10-2 and the printer apparatuses 20A to 20C and 20A-2 to 20C-2. The PC 10-3 forms FAX data that is the print data and transmits FAX data to the FAX transmission apparatus 60 together with a FAX instruction. The FAX transmission apparatus 60 then transmits the FAX data to a predetermined printer apparatus 20A-3, 20B-3, or 20C-3 according to the FAX instruction. The printer apparatuses 20A-3 to 20C-3 then output this FAX data and carries out printing. At this printing system 1-3, a print data management portion restricting print data supplied to the printer engine 28 of the printer apparatuses 20A-3, 20B-3 and 20C-3 to print data having security attributes matching security attributes based on the installation environment may be provided at the FAX transmission apparatus 60 as in the first embodiment, or may be provided at the printer apparatuses 20A-2 to 20C-2 as in the second embodiment. Furthermore, the PC 10-3 may also be provided with the print data management portion.

In each of the embodiments, the printing systems 1 and 1-2 supply print data satisfying the security conditions based on the print data and the security level of the printer apparatuses 20A to 20C-2 (S420 and S430 of FIG. 4) and limit the supply of print data to the printer engine 28 by determining whether the security conditions are satisfied (S520 of FIG. 6), but the restricting method is by no means limited to this. For example, in the second embodiment, it is also possible to determine whether to receive print data based on the security level contained in print data attribute information in the event that the printer apparatuses 20A-2, 20B-2 and 20C-2 receive print data attribute information and to deny receipt of the print data depending on the results of the determination.

In each of the embodiments, the printing systems 1 and 1-2 restrict print data supplied to the printer apparatuses 20A to 20C-2 to print data equal to or less than the security level of the printer apparatuses 20A to 20C-2. However, it is also possible to not provide print data of less than a predetermined security level and restrict the print data to print data of an appropriate security level relative to the security level of the printer apparatuses 20A to 20C-2. The relative conditions for the printer apparatuses 20A to 20C-2 and the print level of the print data can be set in an arbitrary manner. By preventing the printing of print data of a low security level at a printer apparatus of a high security level, it is possible to carry out printing of print data of a high security level in a rapid manner and it is possible to improve printing efficiency.

In each embodiment, it is possible for the PC 10 and 10-2 to form print data described using a page descriptor language (PDL) such as PCL, and supply the print data to the printer apparatuses 20A, 20B, 20C, 20A-2, 20B-2, and 20C-2, or convert PDL print data into image data such as bitmap data for supplying. The data format for the print data exchanged between the PC 10, PC 10-2, and the printer apparatuses 20A, 20B, 20C, 20A-2, 20B-2, and 20C-2 is by no means limited.

In the first embodiment, the print attribute setting portion 112 of the PC 10 sets a user capable of carrying out a print instruction for the print data as a user forming the print data, but it is also possible to set a user in accordance with an instruction of the user forming the print data and generate print data attribute information including instruction-capable user identification information for identifying this user. For example, first, "party B", "business department employees", etc. are set by the user "party A" operating the PC 10 as instruction-capable users capable of carrying out print instructions for formed print data, and instruction-capable user identification information for identifying instruction-capable users is stored in the printer management apparatus 30 as print data attribute information. The printer management apparatus 30 supplies print data within the range of print instruction authority of the user carrying out the print instruction to the printer apparatus 20A based on user identification information for the user carrying out the print instructions inputted from the printer apparatus 20A and the instruction-capable user identification information contained in the print data attribute information. The users instructing formation of the print data can be selected to be users capable of carrying out print instructions and it is, therefore, possible to improve utility and security.

Furthermore, the printer management apparatus 30 may also store time bands where each user is able to carry out printing. For example, if the user is a part-time employee, the printer management apparatus 30 may store his or her working hour as a print-possible time band and supply print data to the printer apparatuses 20A, 20B, and 20C only when the user identification information for this user is inputted in the print-possible time band. It is, therefore, possible to carry out setting according to the attributes of each user and security can be improved.

In the first embodiment, the PC 10 and the printer apparatuses 20A, 20B, and 20C may also be provided with an IC card detecting portion for detecting that the IC card is in a predetermined position by detecting insertion of the IC card 40 into the card reader 14 or 24, detecting that the IC card 40 is introduced within a predetermined range, and detecting that the IC card 40 is moved to a predetermined location where reading of the information stored on the IC card 40 is possible. The start of processing can, therefore, be taken as a trigger and it is possible to improve utility for the user. Moreover, the printer apparatuses 20A, 20B, and 20C may also be inputted with detection of the IC card 40 as a print instruction.

In the first embodiment, the printer apparatuses 20A, 20B, and 20C input user identification information taken as target print data identification information for identifying print data that is the target of print instructions from the IC card 40. However, it is also possible for the printer apparatuses 20A, 20B, and 20C to display identification information for the print data on a display portion (not shown), with the user then operating the input portion 26, selecting print data to be the target of a print instruction, and inputting the target print data identification information so as to input the print data identification information. Furthermore, the print data identification information inputted by the printer apparatuses 20A, 20B, and 20C is by no means limited, providing that the printer apparatuses 20A, 20B, and 20C are capable of identifying the print data that is the target of the print instruction. For example, identification information for the PC 10 and attributes such as the department the user belongs to may be inputted as print data identification information.

The invention claimed is:

1. A printing system having a printing means performing printing based on print data, comprising:
   a plurality of printer apparatuses;
   a print data supplying apparatus for supplying print data to the printer apparatuses;
   an input portion for receiving print instructions from a user;
   a print attribute setting means for performing setting of print attributes comprising receiving from the input portion security attributes for the print data input by the user during the input of the print instructions for instructing formation of the print data from the user and setting the security attributes for the print data;
   a print data restricting means for determining whether to provide the print data to each of the printer apparatuses based on the security attributes for the print data and the security attributes based on a degree of safety of an installation environment of each of the printer apparatuses;
   an authentication information input means for inputting authentication information for authenticating print instruction authority of the user carrying out print instructions; and
   an authentication means for authenticating the print instruction authority of the user based on authentication information inputted by the authentication information input means,
   wherein a trigger for a start of a print processing occurs upon detection of availability of reading of the authentication information,
   wherein the print data restricting means identifies printer apparatuses that are permitted to print based on the print instruction authority authenticated by the authentication means,
   wherein the printing system restricts printing the data on a printer apparatus identified by the print data restricting means when the security attributes for the print data has a security level higher than the security attributes of a printer apparatus among the printer apparatuses.

2. The printing system according to claim 1, wherein the print data restricting means restricts the print data supplied to each of the printer apparatuses to print data further comprising security attributes corresponding to security attributes of a time band of each of the printer apparatuses.

3. The printing system according to claim 1, further comprising:
   a portable information storage medium carried by the user for storing user identification information for identifying the user,
   wherein the authentication information input means inputs authentication information for authenticating the print instruction authority of the user from the portable information storage medium of the user.

4. The printing system according to claim 1, wherein the print data supplying apparatus has a printer apparatus attribute storage means for storing security attributes of each of the printer apparatuses, and
   the print data restricting means provided at the print data supplying apparatus restricts the print data supplied to each printer apparatus to print data having security attributes corresponding to the security attributes of each printer apparatus stored in the printer apparatus attribute storage means.

5. The printing system according to claim 4, the printer apparatus comprising:

a print instruction input means for inputting print instructions of the user;

a target print data identifying information input means for inputting target print data identification information for identifying print data that is a target of a print instruction inputted by the print instruction input means; and a target print data identifying information transmission means for transmitting target print data identifying information inputted by the target print data identifying information input means to the print data supplying apparatus;

the print data supplying apparatus comprising a target print data identifying information receiving means for receiving target print data identification information from the printer apparatus; and the print data restricting means comprising a determination means for determining whether to supply the print data to the printer apparatus based on security attributes for the print data identified using the target print data identification information received by the target print data identifying information receiving means and security attributes of the printer apparatus that is the source of transmission of the target print data identification information, wherein the print data supplying apparatus supplies the print data to the printer apparatus in a case where an affirmative determination by the determination means.

6. A non-transitory computer readable storage medium having stored therein a program executable by a computer, the program being a program for managing print data supplied to at least one of printer apparatuses performing printing based on the print data, comprising:

recording printer apparatus management information of each of the printer apparatuses, wherein the printer apparatus management information having security attributes includes a security level set at each of the printer apparatuses;

receiving from an input portion security attributes for the print data contained within print data attribute information and selected by a user during an input of print instructions for instructing formation of the print data from the user;

storing the print data and print data attribute information received from a communication portion;

receiving user identification information for identifying the user carrying out a print instruction wherein a trigger for a start of a print processing occurs upon detection of availability of reading of the authentication information;

identifying printer apparatus permitted to print the print data based on the user identification information; and determining whether to supply the print data to the identified printer apparatus based on the user identification information, the security attributes for the print data contained within the print data attribute information and the security attributes of the printer apparatus based on a degree of safety of an installation environment of each of the printer apparatuses, wherein the program restricts a predetermined printer apparatus access to the print data when the security attributes for the print data has a security level higher than the security attributes of a printer apparatus among the printer apparatuses.

7. A print data supplying apparatus for supplying print data to printer apparatuses, the print data supplying apparatus comprising:

an input portion for receiving print data attribute information contained within security attributes for the print data selected by a user during an input of print instructions for instructing formation of the print data from the user;

a print data communication means;

a storage means for storing the print data;

a printer apparatus attribute storage means for storing security attributes including a security level set at each of the printer apparatuses;

a print data restricting means for restricting the print data supplied to each of the printer apparatuses to print data having security attributes corresponding to the security attributes based on a degree of safety of an installation environment of each of the printer apparatuses stored in the printer apparatus attribute storage means;

an authentication information input means for inputting authentication information for authenticating print instruction authority of the user carrying out print instructions; and an authentication means for authenticating the print instruction authority of the user based on authentication information inputted by the authentication information input means, wherein a trigger for a start of a print processing occurs upon detection of availability of reading of the authentication information, wherein the print data restricting means identifies printer apparatuses that are permitted to print based on the print instruction authority authenticated by the authentication means, wherein the print data supplying apparatus restricts printing the data on a printer apparatus identified by the print data restricting means when the security attributes for the print data has a security level higher than the security attributes of a printer apparatus among the printer apparatuses.

8. The print data supplying apparatus according to 7, further comprises a print data management information storing means for storing the print data attribute information and user identification information for identifying a user carrying out a print instruction, related to the print data received from the print data communication means, wherein the print data restricting means determines whether to provide the print data to each of the printer apparatuses based on the user identification information, the security attributes of the print data and the security attributes of each of the printer apparatuses.

* * * * *